United States Patent Office 3,063,903
Patented Nov. 13, 1962

3,063,903
NOVEL N-ARYLSULFONYL N'-(CYCLICAMINO) UREAS AND ORAL ANTIDIABETIC COMPOSITIONS CONTAINING SAID NOVEL COMPOUNDS
John B. Wright, Kalamazoo Township, Kalamazoo County, Mich., assignor to The Upjohn Company, Kalamazoo, Mich., a corporation of Delaware
No Drawing. Filed Mar. 29, 1961, Ser. No. 99,023
15 Claims. (Cl. 167—65)

The present invention relates to novel N-arylsulfonyl-N'-(cyclicamino)ureas and more specifically relates to novel N-arylsulfonyl-N'-(cyclicamino)urea free bases and pharmacologically acceptable acid addition salts thereof, and to oral antidiabetic compositions containing said novel compounds as active ingredients. This application is a continuation-in-part of application Serial No. 819,010, filed June 9, 1959, now abandoned.

The novel N-arylsulfonyl-N'-(cyclicamino)urea free bases of the present invention can be represented by the formula:

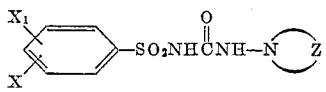

wherein X and $X_1$ represent hydrogen; halogen such as chloro, bromo, fluoro, and the like; alkyl of 1 to 8 carbon atoms, inclusive, such as methyl, ethyl, isopropyl, butyl, isobutyl, isoamyl, hexyl, octyl, and the like; alkoxy of 1 to 8 carbon atoms inclusive, such as methoxy, ethoxy, propoxy, butoxy, hexyloxy, octyloxy, and the like; and primary amino ($NH_2$).

represents saturated heterocyclic amino of 5, 6, 7, 8 and 9 nuclear atoms, inclusive, selected from the group consisting of unsubstituted and mono- and polyalkyl substituted piperidino, morpholino, thiamorpholino, piperazino, pyrrolidino, hexamethyleneimino, heptamethyleneimino, octamethyleneimino, and homomorpholino. Representative mono- and polyalkyl substituted derivatives wherein each alkyl is of 1 to 4 carbon atoms, inclusive, include, e.g., 2-methylhexamethyleneimino, 2,2-dibutylhexamethyleneimino, 3,6-dimethylhexamethyleneimino, 2-ethylmorpholino, 2-ethyl-5-methylmorpholino, 3,3-dimethylmorpholino, 3-methylthiamorpholino, 2,3,5,6-tetramethylthiamorpholino, 2,3,6-trimethylthiamorpholino, 4-butylpiperazino, 4-isopropylpiperazino, 2,2,4,5,5-pentamethylpiperazino, 2,5-diisobutylpiperazino, 2,4,5-trimethylpiperazino, 2-methylpiperidino, 3-methylpiperidino, 4-methylpiperidino, 2-butylpiperidino, 2-propylpiperidino, 4-isopropylpiperidino, 3,4-diethylpiperidino, 2-sec-butylpyrrolidino, 2,2-dimethylpyrrolidino, 2-ethylpyrrolidino, 3,4-dimethylpyrrolidino, 2-isopropylpyrrolidino, and the like.

The compounds of the present invention are useful oral antidiabetic agents. In the past diabetes has been alleviated primarily by the use of insulin. Unfortunately, however, insulin cannot be given orally. Thus, the diabetics before the advent of sulfonylurea therapy for the treatment of diabetes were faced with a lifetime of insulin injections necessary for the maintenance of bodily health. The compounds of the present invention thus provide a means for the relief of diabetes without the necessity of injections. The novel compounds are not only capable of reducing blood sugar to a safe level for a considerable period of time but, in addition, also bring about satisfactory blood-sugar reduction at low dosage levels. The compounds of the present invention are longer acting than tolbutamide, the well known oral antidiabetic agent.

The N-arylsulfonyl-N'-(cyclicamino)ureas of the present invention can be prepared by reacting an arylsulfonylurethane with an N-amino saturated heterocyclic amino compound, according to the process disclosed by Marshall et al., J. Org. Chem. 23, 927, 1958, the said N-amino compound having the formula

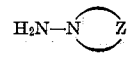

wherein

has the value noted above.

The preparation of compounds of the invention having amino ($NH_2$) substitution on the benzene ring, i.e., N-(aminobenzenesulfonyl)-N'-(cyclicamino)ureas, involves the utilization of a nitro-substituted arylsulfonylurethane, e.g., nitrobenzenesulfonylurethane, to produce the intermediate N-(nitrobenzenesulfonyl)-N'-(cyclicamino)urea, which can then be catalytically hydrogenated, e.g., using a palladium-on-charcoal catalyst, to produce the desired N-(aminobenzenesulfonyl)-N'-(cyclicamino)urea.

The starting arylsulfonylurethanes, many of which are known, can be prepared as disclosed by Marshall et al., supra. The starting N-amino saturated heterocyclic amino compounds can be prepared utilizing the process of Zimmer et al., J. Amer. Chem. Soc. 77, 790, 1955, which involves nitrosating a saturated heterocyclic amino compound having the formula

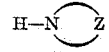

wherein

has the value noted above, with nitrous acid (produced in situ, e.g., by means of an alkali metal nitrite such as sodium nitrite and an acid such as hydrochloric acid) and reducing the resulting N-nitroso saturated heterocyclic amino compound with lithium aluminum hydride. Since nitrosation of piperazine, unsubstituted in the 1 and 4 positions, can occur on both nitrogen atoms, it is generally desirable to utilize 1-benzylpiperazine as a starting compound and to debenzylate the resulting N-arylsulfonyl-N'-(4-benzylpiperazino)urea with hydrogen in the presence of a palladium catalyst according to the process disclosed in U.S. Patent 2,415,786. The reduction of the N-nitroso compound with lithium aluminum hydride is highly exothermic in many instances. Accordingly, it is good practice to bring the reactants together gradually, such as by gradual addition of a solution of the N-nitroso compound in an inert solvent to the reaction mixture containing the lithium aluminum hydride.

Pharmacologically acceptable acid addition salts of the present invention can be prepared from the N-arylsulfonyl-N'-(cyclicamino) urea free bases by conventional methods. For example, the free base can be dissolved in an aqueous solution of the appropriate acid and the salt can be isolated by evaporation of the solution. Alternatively, the free base dissolved in an organic solvent such as methanol, ethanol, ethylacetate, ether, and the like, can be treated with the appropriate acid and according to the nature of the solvent employed the desired salt will separate spontaneously or can be precipitated by the addition of a solvent in which the salt is insoluble. Suitable acids include hydrochloric, sulfuric, hydrobromic, phosphoric, tartaric, acetic, citric, succinic, maleic, benzoic, salicylic, and the like.

The following examples are illustrative of the products of the present invention, but are not to be construed as limiting.

EXAMPLE 1

*N-(4-Chlorobenzenesulfonyl)-N'-Hexamethyleneiminourea*

A. 1-NITROSOHEXAMETHYLENEIMINE

A solution of 89.5 g. of hexamethyleneimine, 75 ml. of concentrated hydrochloric acid and 36 ml. of water was heated to 70° C. on a steam bath. The solution was made acidic by adding 5 ml. of 2 N hydrochloric acid. While maintaining the reaction mixture at 70–75° C., a solution of 67 g. of sodium nitrite in 95 ml. of water was added with stirring over a period of 1 hour. The mixture was then stirred at 70° C. for 2 hours, and then cooled. The upper oily layer was separated and the aqueous layer was then extracted with ether. The combined ether extract and oil was dried over anhydrous magnesium sulfate and concentrated to dryness. Upon distillation of the residue there was obtained 1-nitrosohexamethyleneimine as a yellow oil, boiling at 136–8° C./34 mm.

B. 1-AMINOHEXAMETHYLENEIMINE

To a mixture of 15.18 g. of lithium aluminum hydride and 400 ml. of anhydrous ether was added about 10% of a solution of 51.27 g. of 1-nitrosohexamethyleneimine in 100 ml. of anhydrous ether. The mixture was refluxed until the reaction started. The remainder of the solution was added at such a rate as to maintain gentle reflux. Refluxing was continued for 2 hours more, followed by the successive addition of 16 ml. of water, 12 ml. of 20% aqueous sodium hydroxide solution and 56 ml. of water. The inorganic precipitate was removed by filtration and washed with ether. The filtrate and ether washes were dried and the ether was removed by evaporation. Upon distillation of the residue there was obtained 25.46 g. (56%) of 1-aminohexamethyleneimine as a colorless liquid boiling at 94–6° C./55 mm.

In the same manner as shown in Parts A and B, the following N-amino saturated heterocyclic amines were prepared by substituting the corresponding secondary heterocyclic amine having the formula

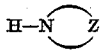

shown above, for hexamethyleneimine: 1-aminopiperidine, 1-amino-4-methylpiperazine, 1-amino-3,6-dimethylhexamethyleneimine, 1-amino-2,2-dibutylhexamethyleneimine, 1-amino-4-methylhexamethyleneimine, 1-aminoheptamethyleneimine, 1-aminoöctamethyleneimine, 4-aminomorpholine, 4-amino-2-ethylmorpholine, 4-amino-3,5-dimethylmorpholine, 4-amino-homomorpholine, 4-aminothiamorpholine, 4-amino-2,3,5-trimethylthiamorpholine, 4-amino-2,6-dimethylthiamorpholine, 1-amino-2-butylpiperidine, 1-amino-5-ethyl-2-methylpiperidine, 1-amino-4-isopropylpiperidine, 1-aminopyrrolidine, 1-amino-2-butyl-5-methylpyrrolidine, 1-amino-2,5-diisopropylpyrrolidine, 1-amino-4-butylpiperazine, 1-amino-4-isopropylpiperazine, 1-amino-2,4,5-trimethylpiperazine, 1-amino-2-methylpiperidine, 1-amino-3-methylpiperidine, 1-amino-4-methylpiperidine, and 1-amino-4,4-dimethylpiperidine.

C. N-(4-CHLOROBENZENESULFONYL)-N'-HEXAMETHYLENEIMINOUREA FREE BASE

A mixture of 11.41 g. of 1-aminohexamethyleneimine and 26.0 g. of 4-chlorobenzenesulfonylurethane (Marshall et al., supra) was heated at 130° C. (oil-bath temperature) for 2 hours. The resulting ethanol and unreacted amine were removed at 100 mm. pressure for 1 hour and at 20 mm. for 2 hours while keeping the oil bath at 130° C. The residue was cooled and recrystallized from methyl ethyl ketone, giving 20.53 g. (66%) of N-(4-chlorobenzenesulfonyl)-N'-hexamethyleneiminourea free base in the form of colorless prisms melting at 196–199° C. After a second recrystallization from methyl ethyl ketone, the melting point was 197–198.5° C.

*Analysis.*—Calcd. for $C_{13}H_{18}ClN_3O_3S$.—C, 47.06; H, 5.47; Cl, 10.68; N, 12.66; S, 9.66. Found: C, 46.95; H, 5.36; Cl, 10.69; N, 12.57; S, 9.73.

D. N-(4-CHLOROBENZENESULFONYL)-N'-HEXAMETHYLENEIMINOUREA HYDROCHLORIDE

N-(4-chlorobenzenesulfonyl) - N'-hexamethyleneiminourea free base was dissolved in ether and gaseous hydrogen chloride was added thereto to produce N-(4-chlorobenzenesulfonyl)-N'-hexamethyleneiminourea hydrochloride.

EXAMPLE 2

*N-(4-Methylbenzenesulfonyl)-N'-Piperidinourea*

A. N-(4-METHYLBENZENESULFONYL)-N'-PIPERIDINOUREA FREE BASE

In a 3-neck flask fitted with a stirrer and a condenser placed downward for distillation was added 39.4 g. of 4-methylbenzenesulfonylurethane and 15.4 g. of 1-aminopiperidine (Zimmer et al., supra). The mixture was stirred and heated in an oil bath at 130° C. for 1.5 hours and then reduced pressure (100 mm.) was applied for 1 hour and a pressure of 15 mm. for 1 hour. To the residue, after cooling, there was added 500 ml. of dilute ammonium hydroxide solution (prepared by adding 1 volume of concentrated ammonium hydroxide to 25 volumes of water) and the mixture was stirred and filtered. The filtrate was acidified with acetic acid and the gummy residue was recrystallized from ethanol. There was thus obtained N-(4-methylbenzenesulfonyl)-N'-piperidinourea free base melting at 193.5° C. (dec.).

*Analysis.*—Calcd. for $C_{13}H_{19}N_3O_3S$.—C, 52.51; H, 6.44; N, 14.13; S, 10.78. Found: C, 52.79; H, 6.65; N, 13.94; S, 10.86.

B. N-(4-METHYLBENZENESULFONYL)-N'-PIPERIDINOUREA CITRATE

In the same manner as shown in Example 1, Part D, N-(4-methylbenzenesulfonyl) - N'-piperidinourea citrate was prepared by substituting N-(4-methylbenzenesulfonyl)-N'-piperidinourea free base and citric acid for N-(4-chlorobenzenesulfonyl)-N'-hexamethyleneiminourea free base and hydrogen chloride.

EXAMPLE 3

*N-(4-Chlorobenzenesulfonyl)N'-(4-Methylpiperazino)urea*

A. N-(4-CHLOROBENZENESULFONYL)-N'-(4-METHYLPIPERAZINO)-UREA FREE BASE

A mixture of 10.9 g. of 1-amino-4-methylpiperazine and 25.0 g. of 4-chlorobenzenesulfonylurethane was heated at 130° C. (oil-bath temperature) for 2 hours. The ethanol and unreacted amine were removed at 100 mm. pressure for 1 hour and at 20 mm. for 2 hours while keeping the oil bath at 130° C. The residue, after being allowed to solidify, was triturated with boiling acetone to give 19.87 g. of cream colored solid melting at 170° C. This product, N-(4-chlorobenzenesulfonyl)-N'-4-methylpiperazino)urea free base, after two recrystallizations from methyl ethyl ketone, melted at 176° C. (dec.).

*Analysis.*—Calcd. for $C_{12}H_{17}ClN_4O_3S$.—C, 43.31; H, 5.15; Cl, 10.65; N, 16.84; S, 9.63. Found: C, 42.97; H, 5.19; Cl, 10.50; N, 17.17; S, 9.87.

B. N-(4-CHLOROBENZENESULFONYL)-N'-(4-METHYLPIPERAZINO)-UREA SULFATE

In the same manner as shown in Example 1, Part D, N-(4-chlorobenzenesulfonyl)-N'-(4-methylpiperazino)urea sulfate was prepared by substituting N-(4-chlorobenzenesulfonyl)-N'-(4-methylpiperazino)urea free base and sulfuric acid for N-(4-chlorobenzenesulfonyl)-N'-hezamethyleneiminourea free base and hydrogen chloride.

EXAMPLE 4

*N-(4-Methylbenzenesulfonyl)-N'-Hexamethyleneiminourea*

A. N-(4-METHYLBENZENESULFONYL)-N'-HEXAMETHYLENEIMINOUREA FREE BASE

A mixture of 11.42 g. of 1-aminohexamethyleneimine and 24.33 g. of 4-methylbenzenesulfonylurethane was heated at 130° C. (oil-bath temperature) for 2 hours. The resulting ethanol and unreacted amine were removed at 15 mm. pressure for 2 hours while keeping the oil bath at 130° C. The residue was cooled and recrystallized from methanol, giving 16.73 g. (54%) of N - (4 - methylbenzenesulfonyl) - N' - hexamethyleneiminourea free base melting at 163–166° C. After a second recrystallization from methanol, the melting point was 163.5–166.5° C.

*Analysis.*—Calcd. for $C_{14}H_{21}N_3O_3S$.—C, 54.00; H, 6.80; N, 13.49; S, 10.30. Found: C, 54.04; H, 6.83; N, 13.35; S, 10.55.

B. N-(4-METHYLBENZENESULFONYL)-N'-HEXAMETHYLENEIMINOUREA HYDROCHLORIDE

N - (4 - methylbenzenesulfonyl) - N' - hexamethyleneiminourea free base (1.0 g.) was dissolved in 50 ml. of ethanolic hydrogen chloride solution. The solution was filtered and anhydrous ether was added to the filtrate in order to cause precipitation of the desired N - (4 - methylbenzenesulfonyl) - N' - hexamethyleneiminourea hydrochloride. This compound, after being recovered by filtration and dried, melted at 158–162° C.

*Analysis.*—Calcd. for $C_{14}H_{22}ClN_3O_3S$.—C, 48.34; H, 6.38; N, 12.08. Found: C, 47.60; H, 6.41; N, 12.33.

EXAMPLE 5

*N-(4-Bromobenzenesulfonyl)-N'-(3,6-Dimethylhexamethyleneimino)urea*

A. N-(4-BROMOBENZENESULFONYL)-N'-(3,6-DIMETHYLHEXAMETHYLENEIMINO)UREA FREE BASE

In the same manner as shown in Example 1, Part C, N - (4 - bromobenzenesulfonyl) - N' - (3,6 - dimethylhexamethyleneimino)-urea free base was prepared by substituting 4-bromobenzenesulfonylurethane (Marshall et al., supra) and 1-amino-3,6-dimethylhexamethyleneimine for 4-chlorobenzenesulfonylurethane and 1-aminohexamethyleneimine.

B. N-(4-BROMOBENZENESULFONYL)-N'-(3,6-DIMETHYLHEXAMETHYLENEIMINO)UREA TARTRATE

In the same manner as shown in Example 1, Part D, N - (4 - bromobenzenesulfonyl) - N' - (3,6 - dimethylhexamethyleneimino)urea tartrate was prepared by substituting N - (4 - bromobenzenesulfonyl) - N' - (3,6-dimethylhexamethyleneimino)urea free base and tartaric acid for N-(4-chlorobenzenesulfonyl)-N'-hexamethyleneiminourea free base and hydrogen chloride.

EXAMPLE 6

*N-(4-Fluorobenzenesulfonyl)-N'-(2,2-Dibutylhexamethyleneimino)urea*

A. N-(4-FLUOROBENZENESULFONYL)-N'-(2,2-DIBUTYLHEXAMETHYLENEIMINO)UREA FREE BASE

In the same manner as shown in Example 1, Part C, N - (4 - fluorobenzenesulfonyl) - N' - (2,2 - dibutylhexamethyleneimino)urea free base was prepared by substituting 4-fluorobenzenesulfonylurethane (Marshall et al., supra) and 1-amino-2,2-dibutylhexamethyleneimine for 4-chlorobenzenesulfonylurethane and 1-aminohexamethyleneimine.

B. N-(4-FLUOROBENZENESULFONYL)-N'-(2,2-DIBUTYLHEXAMETHYLENEIMINO)UREA PHOSPHATE

In the same manner as shown in Example 1, Part D, N - (4 - fluorobenzenesulfonyl) - N' - (2,2 - dibutylhexamethyleneimino)urea phosphate was prepared by substituting N - (4 - fluorobenzenesulfonyl) - N' - (2,2-dibutylhexamethyleneimino)urea free base and phosphoric acid for N-(4-chlorobenzenesulfonyl)-N'-hexamethyleneiminourea free base and hydrogen chloride.

EXAMPLE 7

*N-(2-Methylbenzenesulfonyl)-N'-(4-Methylhexamethyleneimino)urea*

A. N-(2-METHYLBENZENESULFONYL)-N'-(4-METHYLHEXAMETHYLENEIMINO)UREA FREE BASE

In the same manner as shown in Example 1, Part C, N - (2 - methylbenzenesulfonyl) - N' - (4 - methylhexamethyleneimino)urea free base was prepared by substituting 2-methylbenzenesulfonylurethane (Marshall et al., supra) and 1-amino-4-methylhexamethyleneimine for 4-chlorobenzenesulfonylurethane and 1-aminohexamethyleneimine.

B. N-(2-METHYLBENZENESULFONYL)-N'-(4-METHYLHEXAMETHYLENEIMINO)UREA CITRATE

In the same manner as shown in Example 1, Part D, N - (2 - methylbenzenesulfonyl) - N' - (4 - methylhexamethyleneimino)urea citrate was prepared by substituting N - (2 - methylbenzenesulfonyl) - N' - (4 - methylhexamethyleneimino)urea free base and citric acid for N - (4 - chlorobenzenesulfonyl) - N' - hexamethyleneiminourea free base and hydrogen chloride.

EXAMPLE 8

*N-(4-Isopropylbenzenesulfonyl)-N'-Heptamethyleneiminourea*

A. N-(4-ISOPROPYLBENZENESULFONYL)-N'-HEPTAMETHYLENEIMINOUREA FREE BASE

In the same manner as shown in Example 1, Part C, N - (4 - isopropylbenzenesulfonyl) - N' - heptamethyleneiminourea free base was prepared by substituting 4-isopropylbenzenesulfonylurethane (Marshall et al., supra) and 1-aminoheptamethyleneimine for 4-chlorobenzenesulfonylurethane and 1-aminohexamethyleneimine.

B. N-(4-ISOPROPYLBENZENESULFONYL)-N'-HEPTAMETHYLENEIMINOUREA SUCCINATE

In the same manner as shown in Example 1, Part D, N - (4 - isopropylbenzenesulfonyl) - N' - heptamethyleneiminourea succinate was prepared by substituting N-(4 - isopropylbenzenesulfonyl) - N' - heptamethyleneiminourea free base and succinic acid for N-(4-chlorobenzenesulfonyl)-N'-hexamethyleneiminourea free base and hydrogen chloride.

EXAMPLE 9

*N-(4-Butylbenzenesulfonyl)-N'-Octamethyleneiminourea*

A. N-(4-BUTYLBENZENESULFONYL)-N'-OCTAMETHYLENEIMINOUREA FREE BASE

In the same manner as shown in Example 1, Part C, N - (4 - butylbenzenesulfonyl) - N' - octamethyleneiminourea free base was prepared by substituting 4-butylbenzenesulfonylurethane and 1-aminooctamethyleneimine for 4-chlorobenzenesulfonylurethane and 1-aminohexamethyleneimine.

B. N-(4-BUTYLBENZENESULFONYL)-N'-OCTAMETHYLENEIMINOUREA HYDROCHLORIDE

In the same manner as shown in Example 1, Part D, N - (4 - butylbenzenesulfonyl) - N' - octamethyleneiminourea hydrochloride was prepared by substituting N-(4 - butylbenzenesulfonyl) - N' - octamethyleneiminourea free base for N-(4-chlorobenzenesulfonyl)-N'-hexamethyleneiminourea free base.

EXAMPLE 10

*N-(4-Hexylbenzenesulfonyl)-N'-Morpholinourea*

A. N-(4-HEXYLBENZENESULFONYL)-N'-MORPHOLINOUREA FREE BASE

In the same manner as shown in Example 1, Part C, N - (4 - hexylbenzenesulfonyl) - N' - morpholinourea free base was prepared by substituting 4-hexylbenzenesulfonylurethane and 4-aminomorpholine (Zimmer et al., supra) for 4-chlorobenzenesulfonylurethane and 1-aminohexamethyleneimine.

B. N-(4-HEXYLBENZENESULFONYL)-N'-MORPHOLINOUREA MALEATE

In the same manner as shown in Example 1, Part D, N - (4 - hexylbenzenesulfonyl) - N' - morpholinourea maleate was prepared by substituting N-(4-hexylbenzenesulfonyl)-N'-morpholinourea free base and maleic acid for N - (4 - chlorobenzenesulfonyl) - N' - hexamethyleneiminourea free base and hydrogen chloride.

EXAMPLE 11

*N-(4-Octylbenzenesulfonyl)-N'-(2-Ethylmorpholino)urea Free Base*

In the same manner as shown in Example 1, Part C, N-(4 - octylbenzenesulfonyl)-N'-(2-ethylmorpholino)urea free base was prepared by substituting 4-octylbenzenesulfonylurethane and 4-amino-2 - ethylmorpholine for 4-chlorobenzenesulfonylurethane and 1-aminohexamethyleneimine.

EXAMPLE 12

*N-(4-Ethoxybenzenesulfonyl)-N'-(3,5-Dimethylmorpholino)urea*

A. N-(4-ETHOXYBENZENESULFONYL)-N'-(3,5-DIMETHYLMORPHOLINO)UREA FREE BASE

In the same manner as shown in Example 1, Part C, N-(4-ethoxybenzenesulfonyl) - N'-(3,5-dimethylmorpholino)urea free base was prepared by substituting 4-ethoxybenzenesulfonylurethane (Marshall et al., supra) and 4-amino - 3,5 - dimethylmorpholine for 4-chlorobenzenesulfonylurethane and 1-aminohexamethyleneimine.

B. N-(4-ETHOXYBENZENESULFONYL)-N'-(3,5-DIMETHYLMORPHOLINO)UREA BENZOATE

In the same manner as shown in Example 1, Part D, N-(4-ethoxybenzenesulfonyl) - N'-(3,5-dimethylmorpholino)urea benzoate was prepared by substituting N-(4-ethoxybenzenesulfonyl) - N' - (3,5-dimethylmorpholino) urea free base and benzoic acid for N-(4-chlorobenzenesulfonyl)-N'-hexamethyleneiminourea free base and hydrogen chloride.

EXAMPLE 13

*N-(4-Butoxybenzenesulfonyl)-N'-Homomorpholinourea*

A. N-(4-BUTOXYBENZENESULFONYL)-N'-HOMOMORPHOLINOUREA FREE BASE

In the same manner as shown in Example 1, Part C, N-(4-butoxybenzenesulfonyl)-N' - homomorpholinourea free base was prepared by substituting 4-butoxybenzenesulfonylurethane (Marshall et al., supra) and 4-amino-homomorpholine for 4-chlorobenzenesulfonylurethane and 1-aminohexamethyleneimine.

B. N-(4-BUTOXYBENZENESULFONYL)-N'-HOMOMORPHOLINOUREA HYDROBROMIDE

In the same manner as shown in Example 1, Part D, N - (4-butoxybenzenesulfonyl)-N' - homomorpholinourea hydrobromide was prepared by substituting N-(4-butoxybenzenesulfonyl)-N'-homomorpholinourea free base and hydrogen bromide for N-(4-chlorobenzenesulfonyl)-N'-hexamethyleneiminourea free base and hydrogen chloride.

EXAMPLE 14

*N-(3-Amyloxybenzenesulfonyl)-N'-Thiamorpholinourea*

A. N-(3-AMYLOXYBENZENESULFONYL)-N'-THIAMORPHOLINOUREA FREE BASE

In the same manner as shown in Example 1, Part C, N-(3 - amyloxybenzenesulfonyl)-N' - thiamorpholinourea free base was prepared by substituting 3-amyloxybenzenesulfonylurethane and 4-aminothiamorpholine for 4-chlorobenzenesulfonylurethane and 1-aminohexamethyleneimine.

B. N-(3-AMYLOXYBENZENESULFONYL)-N'-THIAMORPHOLINOUREA PHOSPHATE

In the same manner as shown in Example 1, Part D, N-(3 - amyloxybenzenesulfonyl)-N' - thiamorpholinourea phosphate was prepared by substituting N-(3-amyloxybenzenesulfonyl)-N'-thiamorpholinourea free base and phosphoric acid for N - (4 - chlorobenzenesulfonyl)-N'-hexamethyleneiminourea and hydrogen chloride.

EXAMPLE 15

*N-(4-Octyloxybenzenesulfonyl)-N'-(2,3,5-Trimethylthiamorpholino)urea Free Base*

In the same manner as shown in Example 1, Part C, N-(4-octyloxybenzenesulfonyl)-N' - (2,3,5-trimethylthiamorpholino)urea free base was prepared by substituting 4-octyloxybenzenesulfonylurethane and 4-amino-2,3,5-trimethylthiamorpholine for 4 - chlorobenzenesulfonylurethane and 1-aminohexamethyleneimine.

EXAMPLE 16

*N-Benzenesulfonyl-N'-(2,6-Dimethylthiamorpholino)urea*

A. N-BENZENESULFONYL-N'-(2,6-DIMETHYLTHIAMORPHOLINO)UREA FREE BASE

In the same manner as shown in Example 1, Part C, N-benzenesulfonyl - N'-(2,6-dimethylthiamorpholino)urea free base was prepared by substituting benzenesulfonylurethane and 4-amino-2,6-dimethylthiamorpholine for 4-chlorobenzenesulfonylurethane and 1-aminohexamethyleneimine.

B. N-BENZENESULFONYL-N'-(2,6-DIMETHYLTHIAMORPHOLINO)UREA ACETATE

In the same manner as shown in Example 1, Part D, N-benzenesulfonyl-N' - (2,6-dimethylthiamorpholino)urea acetate was prepared by substituting N-benzenesulfonyl-N'-(2,6-dimethylthiamorpholino)urea free base and acetic acid for N-(4-chlorobenzenesulfonyl)-N'-hexamethyleneiminourea free base and hydrogen chloride.

EXAMPLE 17

*N-Benzenesulfonyl-N'-(2-Butylpiperidino)urea Free Base*

In the same manner as shown in Example 1, Part C, N-benzenesulfonyl - N' - (2-butylpiperidino)urea free base was prepared by substituting benzenesulfonylurethane and 1-amino-2-butylpiperidine for 4-chlorobenzenesulfonylurethane and 1-aminohexamethyleneimine.

EXAMPLE 18

*N-(3-Methoxybenzenesulfonyl)-N'-(5-Ethyl-2-Methylpiperidino)urea Free Base*

In the same manner as shown in Example 1, Part C, N-(3-methoxybenzenesulfonyl) - N' - (5-ethyl-2-methylpiperidino)urea free base was prepared by substituting 3-methoxybenzenesulfonylurethane and 1-amino-5-ethyl-2-methylpiperidine for 4-chlorobenzenesulfonylurethane and 1-aminohexamethyleneimine.

EXAMPLE 19

*N-(2,4-Dichlorobenzenesulfonyl)-N'-(4-Isopropylpiperidino)urea Free Base*

In the same manner as shown in Example 1, Part C, N-(2,4-dichlorobenzenesulfonyl)-N' - (4-isopropylpiperidino)urea free base was prepared by substituting 2,4-dichlorobenzenesulfonylurethane (Marshall et al., supra) and 1-amino-4-isopropylpiperidine for 4-chlorobenzenesulfonylurethane and 1-aminohexamethyleneimine.

EXAMPLE 20

*N-(3-Chloro-4-Methylbenzenesulfonyl)-N'-(2-Butyl-5-Methylpyrrolidino)urea Free Base*

In the same manner as shown in Example 1, Part C, N-(3-chloro-4-methylbenzenesulfonyl) - N'-(2-butyl - 5-methylpyrrolidino)urea free base was prepared by substituting 3-chloro-4-methylbenzenesulfonylurethane (Marshall et al., supra) and 1-amino-2-butyl-5-methylpyrrolidine for 4-chlorobenzenesulfonylurethane and 1-aminohexamethyleneimine.

EXAMPLE 21

*N-(2,4-Dimethoxybenzenesulfonyl)-N'-(2,5-Diisopropylpyrrolidino)urea Free Base*

In the same manner as shown in Example 1, Part C, N-(2,4-dimethoxybenzenesulfonyl)-N' - (2,5-diisopropylpyrrolidino)urea free base was prepared by substituting 2,4-dimethoxybenzenesulfonylurethane (Marshall et al., supra) and 1 - amino - 2,5-diisopropylpyrrolidine for 4-chlorobenzenesulfonylurethane and 1-aminohexamethyleneimine.

EXAMPLE 22

*N-(2-Methyl-4-Methoxybenzenesulfonyl)-N'-Pyrrolidinourea*

A. N-(2-METHYL-4-METHOXYBENZENESULFONYL)-N'-PYRROLIDINOUREA FREE BASE

In the same manner as shown in Example 1, Part C, N-(2-methyl - 4 - methoxybenzenesulfonyl)-N'-pyrrolidinourea free base was prepared by substituting 2-methyl-4 - methoxybenzenesulfonylurethane (Marshall et al., supra) and 1-aminopyrrolidine for 4-chlorobenzenesulfonylurethane and 1-aminohexamethyleneimine.

B. N-(2-METHYL-4-METHOXYBENZENESULFONYL)-N'-PYRROLIDINOUREA SALICYLATE

In the same manner as shown in Example 1, Part D, N - (2 - methyl-4-methoxybenzenesulfonyl)-N'-pyrrolidinourea salicylate was prepared by substituting N-(2-methyl - 4 - methoxybenzenesulfonyl)-N'-pyrrolidinourea free base and salicylic acid for N-(4-chlorobenzenesulfonyl)-N'-hexamethyleneiminourea free base and hydrogen chloride.

EXAMPLE 23

*N-(2,6-Dimethylbenzenesulfonyl)-N'-(4-Butylpiperazino)urea Free Base*

In the same manner as shown in Example 1, Part C, N - (2,6-dimethylbenzenesulfonyl)-N'-(4-butylpiperazino)urea free base was prepared by substituting 2,6-dimethylbenzenesulfonylurethane and 1-amino-4-butylpiperazine for 4-chlorobenzenesulfonylurethane and 1-aminohexamethyleneimine.

EXAMPLE 24

*N-(3-Ethoxybenzenesulfonyl)-N'-(4-Isopropylpiperazino)urea Free Base*

In the same manner as shown in Example 1, Part C, N-(3-ethoxybenzenesulfonyl)-N'-(4-isopropylpiperazino)urea free base was prepared by substituting 3-ethoxybenzenesulfonylurethane and 1-amino-4-isopropylpiperazine for 4-chlorobenzenesulfonylurethane and 1-aminohexamethyleneimine.

EXAMPLE 25

*N-(4-Chlorobenzenesulfonyl)-N'-(2,4,5-Trimethylpiperazino)urea Free Base*

In the same manner as shown in Example 1, Part C, N - (4 - chlorobenzenesulfonyl)-N'-(2,4,5-trimethylpiperazino)urea free base was prepared by substituting 1-amino-2,4,5-trimethylpiperazine for 1-aminohexamethyleneimine.

EXAMPLE 26

*N-(3-Bromobenzenesulfonyl)-N'-Piperazinourea*

A. 1-AMINO-4-BENZYLPIPERAZINE

In the same manner as shown in Example 1, Parts A and B, 1-amino-4-benzylpiperazine was prepared by substituting 4-benzylpiperazine (U.S. Patent 2,415,785) for hexamethyleneimine.

B. N-(3-BROMOBENZENESULFONYL)-N'-(4-BENZYLPIPERAZINO)UREA FREE BASE

In the same manner as shown in Example 1, Part C, N - (3 - bromobenzenesulfonyl)-N'-(4-benzylpiperazino)urea free base was prepared by substituting 3-bromobenzenesulfonylurethane and 1-amino-4-benzylpiperazine for 4-chlorobenzenesulfonylurethane and 1-aminohexamethyleneimine.

C. N-(3-BROMOBENZENESULFONYL)-N'-PIPERAZINOUREA FREE BASE

In the same manner as shown in U.S. Patent 2,415,786, N-(3-bromobenzenesulfonyl)-N'-piperazinourea free base was prepared by debenzylating N-(3-bromobenzenesulfonyl)-N'-(4-benzylpiperazino)urea free base with hydrogen in the presence of palladium-on-charcoal catalyst.

D. N-(3-BROMOBENZENESULFONYL-N'-PIPERAZINOUREA TARTRATE

In the same manner as shown in Example 1, Part D, N - (3-bromobenzenesulfonyl)-N'-piperazinourea tartrate was prepared by substituting N-(3-bromobenzenesulfonyl)-N'-piperazinourea free base and tartaric acid for N-(4-chlorobenzenesulfonyl)-N'-hexamethyleneiminourea free base and hydrogen chloride.

EXAMPLE 27

*N-(4-Methylbenzenesulfonyl)-N'-(2,5-Diethylpiperazino)urea Free Base*

A. 4-BENZYL-2,5-DIETHYLPIPERAZINE 4-benzyl-2,5-diethylpiperazine was prepared by benzylating 2,5-diethylpiperazine according to the process disclosed in U.S. Patent 2,415,785.

B. 1-AMINO-4-BENZYL-2,5-DIETHYLPIPERAZINE

In the same manner as shown in Example 1, Parts A and B, 1-amino-4-benzyl-2,5-diethylpiperazine was prepared by substituting 4-benzyl-2,5-diethylpiperazine for hexamethyleneimine.

C. N-(4-METHYLBENZENESULFONYL)-N'-(4-BENZYL-2,5-DIETHYLPIPERAZINO)UREA FREE BASE

In the same manner as shown in Example 1, Part C, N - (4 - methylbenzenesulfonyl)-N'-(4-benzyl-2,5-diethylpiperazino)urea free base was prepared by substituting 4-methylbenzenesulfonylurethane and 1-amino-4-benzyl-2,5-diethylpiperazine for 4-chlorobenzenesulfonylurethane and 1-aminohexamethyleneimine.

D. N-(4-METHYLBENZENESULFONYL)-N'-(2,5-DIETHYLPIPERAZINO)UREA FREE BASE

N - (4 - methylbenzenesulfonyl) - N'-(2,5-diethylpiperazino)urea free base was prepared by debenzylation of N - (4 - methylbenzenesulfonyl)-N'-(4-benzyl-2,5-diethylpiperazino)urea free base, utilizing the process disclosed in U.S. Patent 2,415,786.

EXAMPLE 28

*N-(4-Aminobenzenesulfonyl)-N'-Piperidinourea Free Base*

A. N-(4-NITROBENZENESULFONYL)-N'-PIPERIDINOUREA FREE BASE

In the same manner as shown in Example 1, Part C, N-(4-nitrobenzenesulfonyl)-N'-piperidinourea free base was prepared by substituting 4-nitrobenzenesulfonylurethane (British Patent 604,259) and 1-aminopiperidine for 4-chlorobenzenesulfonylurethane and 1-aminohexamethyleneimine.

B. N-(4-AMINOBENZENESULFONYL)-N'-PIPERIDINOUREA FREE BASE

Hydrogenation of N-(4-nitrobenzenesulfonyl)-N'-piperidinourea free base in a 1:30 ammonium hydroxide solution with 10% palladium-on-charcoal catalyst resulted in a crude solid that was recrystallized from 95% ethanol to produce N - (4 - aminobenzenesulfonyl)-N'-piperidinourea free base.

EXAMPLE 29

N-(4-Methyl-3-Aminobenzenesulfonyl)-N'-Morpholinourea Free Base

A. N-(4-METHYL-3-NITROBENZENESULFONYL)-N'-MORPHOLINOUREA FREE BASE

In the same manner as shown in Example 1, Part C, N-(4-methyl-3-nitrobenzenesulfonyl)-N'-morpholinourea free base was prepared by substituting 4-methyl-3-nitrobenzenesulfonylurethane and 4-aminomorpholine for 4-chlorobenzenesulfonylurethane and 1-aminohexamethyleneimine.

B. N-(4-METHYL-3-AMINOBENZENESULFONYL)-N'-MORPHOLINOUREA FREE BASE

Hydrogenation of N-(4-methyl-3-nitrobenzenesulfonyl)-N'-morpholinourea free base in the manner shown in Example 28, Part B, resulted in the production of N-(4-methyl-3-aminobenzenesulfonyl)-N'-morpholinourea free base.

EXAMPLE 30

N-(4-Methylbenzenesulfonyl)-N'-(2-Methylpiperidino)-urea Free Base

In the same manner as shown in Example 1, Part C, 22.92 g. (0.1 mole) of 4-methylbenzenesulfonylurethane was reacted with 11.42 g. (0.1 mole) of 1-amino-2-methylpiperidine. The resulting residue was recrystallized from ethanol. There was thus obtained 16.88 g. (54%) of N-(4-methylbenzenesulfonyl)-N'-(2-methylpiperidino)urea free base melting at 173.5–174.5° C.

*Analysis.*—Calcd. for $C_{14}H_{21}N_3O_3S$.—C, 54.00; H, 6.80; N, 13.49. Found: C, 54.56; H, 6.96; N, 13.21.

EXAMPLE 31

N-(4-Methylbenzenesulfonyl)-N'-(3-Methylpiperidino)-urea Free Base

In the same manner as shown in Example 1, Part C, 22.92 g. (0.1 mole) of 4-methylbenzenesulfonylurethane was reacted with 11.42 g. (0.1 mole) of 1-amino-3-methylpiperidine. The resulting residue was triturated with ethanol and was then air-dried. There was thus obtained 28.2 g. (90.6%) of N-(4-methylbenzenesulfonyl)-N'-(3-methylpiperidino)urea free base melting at 177–180° C. An analytical sample prepared by recrystallization from a 1:1 (by volume) ethanol-ethyl acetate mixture melted at 179–180° C.

*Analysis.*—Calcd. for $C_{14}H_{21}N_3O_3S$.—C, 54.00; H, 6.80; N, 13.49; S, 10.30. Found: C, 54.27; H, 7.18; N, 13.07; S, 10.39.

EXAMPLE 32

N-(4-Methylbenzenesulfonyl)-N'-(4-Methylpiperidino)-urea Free Base

In the same manner as shown in Example 1, Part C, 22.92 g. (0.1 mole) of 4-methylbenzenesulfonylurethane was reacted with 11.42 g. (0.1 mole) of 1-amino-4-methylpiperidine. The resulting residue was recrystallized from ethanol. There was thus obtained a 66% yield of N-(4-methylbenzensulfonyl)-N'-(4-methylpiperidino)urea free base melting at 188–189° C.

*Analysis.*—Calcd. for $C_{14}H_{21}N_3O_3S$.—C, 54.00; H, 6.80; N, 13.49; S, 10.30. Found: C, 53.72; H, 6.79; N, 13.34; S, 10.33.

EXAMPLE 33

N-(4-Methylbenzenesulfonyl)-N'-(4,4-Dimethylpiperidino)urea Free Base

In the same manner as shown in Example 1, Part C, 6.72 g. (0.029 mole) of 4-methylbenzenesulfonylurethane was reacted with 3.75 g. (0.029 mole) of 1-amino-4,4-dimethylpiperidine. The resulting residue was recrystallized from ethanol. There was thus obtained 4.68 g. (53%) of N-(4-methylbenzenesulfonyl)-N'-(4,4-dimethylpiperidino)urea free base melting at 165–168° C. An analytical sample prepared by a second recrystallization from ethanol melted at 165–167° C.

*Analysis.*—Calcd. for $C_{15}H_{23}N_3O_3S$.—C, 55.36; H, 7.12; N, 12.91; S, 9.85. Found: C, 55.32; H, 7.05; N, 12.87; S, 9.77.

EXAMPLE 34

N-(4-Chlorobenzenesulfonyl)-N'-(4-Methylpiperidino)-urea Free Base

In the same manner as shown in Example 1, Part C, 4-chlorobenzenesulfonylurethane was reacted with an equimolar amount of 1-amino-4-methylpiperidine. The resulting residue was recrystallized from dioxane. There was thus obtained a 60% yield of N-(4-chlorobenzenesulfonyl)-N'-(4-methylpiperidino)urea free base melting at 222° C. (dec.).

*Analysis.*—Calcd. for $C_{13}H_{18}ClN_3O_3S$.—C, 47.06; H, 5.47; Cl, 10.68; N, 12.66; S, 9.66. Found: C, 47.38; H, 5.37; Cl, 10.51; N, 12.75; S, 9.85.

EXAMPLE 35

N-(4-Chlorobenzenesulfonyl)-N'-(4,4-Dimethylpiperidino)urea Free Base

In the same manner as shown in Example 1, Part C, 4-chlorobenzenesulfonylurethane was reacted with an equimolar amount of 1-amino-4,4-dimethylpiperidine. The resulting residue was recrystallized from dioxane. There was thus obtained a 59% yield of N-(4-chlorobenzenesulfonyl)-N'-(4,4-dimethylpiperidino)urea free base melting at 220° C. (dec.).

*Analysis.*—Calcd. for $C_{14}H_{20}ClN_3O_3S$.—C, 48.62; H, 5.83; Cl, 10.25; S, 9.27. Found: C, 48.79; H, 5.85; Cl, 9.80; S, 9.60

EXAMPLE 36

N-(4-Methylbenzenesulfonyl)-N'-Pyrrolidinourea Free Base

In the same manner as shown in Example 1, Part C, 11.46 g. (0.05 mole) of 4-methylbenzenesulfonylurethane was reacted with 4.31 g. (0.05 mole) of 1-aminopyrrolidine. The resulting residue was recrystallized twice from ethanol. There was thus obtained N-(4-methylbenzenesulfonyl)-N'-pyrrolidinourea free base melting at 186–188° C.

*Analysis.*—Calcd. for $C_{12}H_{17}N_3O_3S$.—C, 50.86; H, 6.05; N, 14.83; S, 11.32. Found: C, 51.55; H, 6.22; N, 14.28; S, 11.43.

EXAMPLE 37

N-(4-Chlorobenzenesulfonyl)-N'-Pyrrolidinourea Free Base

In the same manner as shown in Example 1, Part C, 13.19 g. (0.05 mole) of 4-chlorobenzenesulfonylurethane was reacted with 4.31 g. (0.05 mole) of 1-aminopyrrolidine. The resulting residue was treated with boiling ethanol, the mixture was filtered, and the filter cake was dried. There was thus obtained 7.52 g. of solid N-(4-chlorobenzenesulfonyl)-N'-pyrrolidinourea free base. An additional 1.62 g. of the same compound was obtained from the filtrate; total yield, 9.14 g. (60%). An analytical sample prepared by recrystallization from a 1:1 (by volume) ethanol-ethyl acetate mixture melted at 194.5–195.5° C.

*Analysis.*—Calcd. for $C_{11}H_{14}ClN_3O_3S$.—C, 43.49; H, 4.64; N, 13.83; S, 10.56. Found: C, 43.68; H, 4.72; N, 13.94; S, 10.13.

EXAMPLE 38

N-(4-Methylbenzenesulfonyl)-N'-Morpholinourea Free Base

In the same manner as shown in Example 1, Part C, 29.42 g. (0.13 mole) of 4-methylbenzenesulfonylurethane was reacted with 13.1 g. (0.13 mole) of 4-aminomorpholine. The resulting residue was triturated with ethanol and was then air-dried. There was thus obtained 36.1 g. (94%) of N-(4-methylbenzenesulfonyl)-N'-morpholinourea free base melting at 197–202° C. An analytical sample prepared by recrystallization from ethanol melted at 203–205° C.

*Analysis.*—Calcd. $C_{12}H_{17}N_3O_4S$.—C, 48.15; H, 5.73; N, 14.04; S, 10.71. Found: C, 47.78; H, 5.35; N, 14.24; S, 10.74.

EXAMPLE 39

N-(4-Methoxybenzenesulfonyl)-N'-Hexamethyleneiminourea Free Base

In the same manner as shown in Example 1, Part C, 25.93 g. (0.1 mole) of 4-methoxybenzenesulfonylurethane (Marshall et al., supra) was reacted with 11.42 g. (0.1 mole) of 1-aminohexamethyleneimine. The resulting syrupy residue was triturated with methanol to cause crystallization. There was thus obtained N-(4-methoxybenzenesulfonyl)-N'-hexamethyleneiminourea free base melting at 169–170.5° C. Recrystallization from ethanol did not change the melting point.

*Analysis.*—Calcd. for $C_{14}H_{21}N_3O_4S$.—C, 51.36; H, 6.47; N, 12.83; S, 9.79. Found: C, 51.44; H, 6.44; N, 12.45; S, 9.73.

EXAMPLE 40

N-(4-Bromobenzenesulfonyl)-N'-Hexamethyleneiminourea Free Base

In the same manner as shown in Example 1, Part C, 30.82 g. (0.1 mole) of 4-bromobenzenesulfonylurethane was reacted with 11.42 g. (0.1 mole) of 1-aminohexamethyleneimine. The resulting residue was recrystallized from methyl ethyl ketone. There was thus obtained 13.51 g. (35.9%) of N-(4-bromobenzenesulfonyl)-N'-hexamethyleneiminourea free base melting at 205–206.5° C.

*Analysis.*—Calcd. $C_{13}H_{18}BrN_3O_3S$.—C, 41.50; H, 4.82; N, 11.17; S, 8.52. Found: C, 41.88; H, 4.83; N, 11.03; S, 8.51.

EXAMPLE 41

N-(4-Methylbenzenesulfonyl)-N'-heptamethyleneiminourea Free Base

In the same manner as shown in Example 1, Part C, 22.92 g. (0.1 mole) of 4-methylbenzenesulfonylurethane was reacted with 12.82 g. (0.1 mole) of 1-aminoheptamethyleneimine. The resulting semi-solid residue crystallized on standing, after which it was triturated with ethanol, air-dried, and recrystallized from 50% aqueous ethanol. The N-(4-methylbenzenesulfonyl)-N'-heptamethyleneiminourea free base thus obtained melted at 146–147° C.

*Analysis.*—Calcd. for $C_{15}H_{23}N_3O_3S$.—C, 55.36; H, 7.12; N, 12.91; S, 9.85. Found: C, 55.73; H, 7.03; N, 12.78; S, 9.90.

EXAMPLE 42

N-(4-Methylbenzenesulfonyl)-N'-(4-Methylhexamethyleneimino)urea Free Base

In the same manner as shown in Example 1, Part C, N-(4-methylbenzenesulfonyl) - N'-(4-methylhexamethyleneimino)urea free base was prepared by substituting 4-methylbenzenesulfonylurethane and 1-amino-4-methylhexamethyleneimine for 4-chlorobenzenesulfonylurethane and 1-aminohexamethyleneimine.

EXAMPLE 43

N-(4-Chlorobenzenesulfonyl)-N'-(4-Methylhexamethyleneimino)urea Free Base

In the same manner as shown in Example 1, Part C, N-(4-chlorobenzenesulfonyl) - N'-(4-methylhexamethyleneimino)urea free base was prepared by substituting 1-amino-4-hexamethyleneimine for 1-aminohexamethyleneimine.

EXAMPLE 44

N-(4-Methylbenzenesulfonyl)-N'-(4,4-Dimethylhexamethyleneimino)urea Free Base

A. 4,4-DIMETHYLHEXAMETHYLENEIMINE

Following the process disclosed by Blicke et al., J. Amer. Chem. Soc. 76, 2317, 1954, for the conversion of 4-methylcyclohexanone to 4-methylhexamethyleneimine, but substituting 4,4-dimethylcyclohexanone (Reid et al., J. Org. Chem. 18, 661, 1953) for 4-methylcyclohexanone, 4,4-dimethylhexamethyleneimine was prepared. The 4,4-dimethylcyclohexanone was reacted with hydrazoic acid (prepared in situ in the reaction mixture with sodium azide and concentrated hydrochloric acid) to obtain 4,4-dimethyl-7-oxohexamethyleneimine, which was then reduced with lithium aluminum hydride to obtain the desired 4,4-dimethylhexamethyleneimine.

B. 1-AMINO-4,4-DIMETHYLHEXAMETHYLENEIMINE

In the same manner as shown in Example 1, Parts A and B, but substituting 4,4-dimethylhexamethyleneimine for hexamethyleneimine, 1-amino-4,4-dimethylhexamethyleneimine was prepared.

C. N-(4-METHYLBENZENESULFONYL)-N'-(4,4-DIMETHYLHEXAMETHYLENEIMINO)UREA FREE BASE

In the same manner as shown in Example 1, Part C, N-(4-methylbenzenesulfonyl) - N' - (4,4-dimethylhexamethyleneimino)urea free base was prepared by substituting 4-methylbenzenesulfonylurethane and 1-amino-4,4-dimethylhexamethyleneimine for 4-chlorobenzenesulfonylurethane and 1-aminohexamethyleneimine.

EXAMPLE 45

N-(4-Chlorobenzenesulfonyl)-N'-(4,4-Dimethylhexamethyleneimino)urea Free Base In the same manner as shown in Example 1, Part C, N-(4-chlorobenzenesulfonyl) - N' - (4,4-dimethylhexamethyleneimino)urea free base was prepared by substituting 1-amino-4,4-dimethylhexamethyleneimine for 1-aminohexamethyleneimine.

As indicated hereinbefore the compounds of the present invention are useful for the treatment of diabetes perorally and for this purpose the active compounds are associated with a pharmaceutically acceptable carrier.

For such oral administration the active compounds can be administered in liquid or solid dosage forms. Solid forms include capsules, tablets, powders, pills, and the like, and liquid forms include suitably flavored aqueous suspensions and solutions (depending on concentration desired), and flavored oil suspensions and solutions wherein edible oils, e.g., corn oil, cottonseed oil, coconut oil, peanut oil, sesame oil, or mixtures of these, and the like can be employed.

For preparing compositions such as tablets and other compressed formulations the composition can include any compatible and edible tableting material used in pharmaceutical practice, e.g., corn starch, lactose, stearic acid, magnesium stearate, talc, methyl cellulose, and the like.

Similarly, the compounds of the present invention can be mixed with suitable adjuvants for the preparation of resorbable hard gelatin or soft capsules utilizing conventional pharmaceutical practices.

The following illustrative compositions are within the scope of the present invention:

(1) *Hard gelatin capsules.*—10,000 two-piece hard gelatin capsules for oral use, each containing 200 milligrams of N-(4-methylbenzenesulfonyl)-N'-piperidinourea free base are prepared from the following amounts and types of materials:

| | Gm. |
|---|---|
| N-(4-methylbenzenesulfonyl) - N' - piperidinourea free base | 2000 |
| Corn starch | 1616 |
| Mineral oil, U.S.P. | 129.6 |
| Magnesium stearate, powder | 162 |
| Talc, U.S.P. | 162 |

The finely powdered N-(4-methylbenzenesulfonyl)-N'-piperidinourea free base is mixed thoroughly with the rest of the ingredients and then capsulated.

(2) *Soft elastic capsules.*—One-piece soft elastic capsules for oral use, each containing 100 milligrams of N-(4-chlorobenzenesulfonyl) - N'-hexamethyleneiminourea free base are prepared in the usual manner by first dispersing the active ingredient in sufficient corn oil to render the material capsulatable.

(3) *Oil suspension.*—An oil suspension for oral use, containing in each 5 milliliters 200 milligrams of N-(4-methylbenzenesulfonyl)-N'-hexamethyleneiminourea free base is prepared from the following types and amounts of materials:

| | |
|---|---|
| Sweetening agent _____gm__ | 3.5 |
| N - (4 - methylbenzensulfonyl) - N' - hexamethyleneiminourea free base _____gm__ | 400 |
| Preservative _____gm__ | 20 |
| Antioxidant _____gm__ | 1 |
| Flavoring _____ml__ | 25 |

Aluminum monostearate-corn oil gel to make 10,000 ml.

(4) *Tablet.*—10,000 oral tablets each containing 250 milligrams of N - (4 - methylbenzenesulfonyl) - N' - piperidinourea free base are prepared from the following types and amounts of materials:

| | Gm. |
|---|---|
| N - (4 - methylbenzenesulfonyl) - N' - piperidinourea free base _____ | 2500 |
| Dicalcium phosphate _____ | 3050 |
| Methylcellulose, U.S.P. (15 cps.) _____ | 65 |
| Talc, bolted _____ | 450 |
| Calcium stearate, fine powder _____ | 35 |

The ingredients are mixed in a conventional manner and compressed into tablets, each containing 250 mg. of active ingredient.

In the same manner, tablets containing 50 mg. and 100 mg. of N - (4 - chlorobenzenesulfonyl) - N' - hexamethyleneiminourea free base are prepared by replacing the 2500 gm. of N-(4-methylbenzenesulfonyl)-N'-piperidinourea free base with 500 gm. and 1000 gm., respectively, of N - (4 - chlorobenzenesulfonyl) - N' - hexamethyleneiminourea free base.

Also, tablets containing 50 mg., 100 mg. and 200 mg. of N - (4 - methylbenzenesulfonyl) - N' - hexamethyleneiminourea free base are prepared by replacing the 2500 gm. of N-(4-methylbenzenesulfonyl)-N'-piperidinourea free base with 500 gm., 1000 gm. and 2000 gm., respectively, of N - (4 - methylbenzenesulfonyl) - N' - hexamethyleneiminourea free base.

Tablets containing 50 mg., 100 mg. and 200 mg. of N-(4 - methylbenzenesulfonyl) - N' - (4 - methylpiperidino)-urea free base are also prepared by replacing the 2500 gm. of N-(4-methylbenzenesulfonyl)-N'-piperidinourea free base with 500 gm., 1000 gm. and 2000 gm., respectively, of N - (4 - methylbenzenesulfonyl) - N' - (4-methylpiperidino)urea free base.

Likewsie, tablets containing 50 mg. and 100 mg. of N - (4 - methylbenzenesulfonyl) - N' - (4,4 - dimethylpiperidino)urea free base are prepared by replacing the 2500 gm. of N - (4 - methylbenzenesulfonyl) - N' - piperidinourea free base with 500 gm. and 1000 gm., respectively, of N - (4 - methylbenzenesulfonyl) - N' - (4,4 - dimethylpiperidino)urea free base.

(5) *Syrup.*—A sugar-free syrup for oral use containing in each 5 milliliters 250 milligrams of N-(4-chlorobenzenesulfonyl)-N'-(4-methylpiperazino)urea sulfate is prepared from the following types and amounts of materials:

| | |
|---|---|
| N - (4 - chlorobenzenesulfonyl) - N' - (4 - methylpiperazino)urea sulfate _____gm__ | 500 |
| Methylparaben, U.S.P. _____gm__ | 3 |
| Sorbic acid _____gm__ | 3 |
| Sweetening agent _____gm__ | 18 |
| Flavoring _____ml__ | 3 |
| Glycerin _____ml__ | 1500 |

Deionized water to make 10,000 ml.

A dose of 1 teaspoonful (5 ml.) to 1 tablespoonful (15 ml.) will give the patient 250 to 750 mg. of N-(4-chlorobenzenesulfonyl)-N'-(4-methylpiperazino)urea sulfate.

The dosage of the novel compounds of the present invention for the treatment of diabetes depends on the age, weight, and condition of the patient being treated. Generally speaking for adult oral administration the preferred unit dosage is 50 to 500 mg. of active compound with a suitable pharmaceutical diluent and/or lubricant. One or two unit dosages are given one to four times a day. A total daily dose of from 50 to 1500 mg. given singly but preferably in divided doses, embraces the effective range for the treatment of diabetes.

In addition to the foregoing principal active ingredients, the present compositions can also include, as supplementary active ingredients, other blood sugar lowering compounds, such as tolbutamide, chlorpropamide and phenformin. Such supplementary active ingredients can be included in these compositions in amounts approximately equal to or less than the concentrations employed where such materials are the sole active ingredients.

I claim:
1. A compound selected from the group consisting of (1) N - arylsulfonyl - N' - (cyclicamino)urea free bases having the formula:

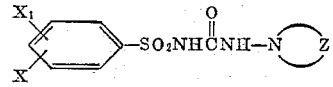

wherein X and $X_1$ are selected from the group consisting of hydrogen, halogen, alkyl of from 1 to 8 carbon atoms, inclusive, alkoxy of from 1 to 8 carbon atoms, inclusive, and primary amino ($NH_2$), and

is saturated heterocyclic amino selected from the group consisting of unsubstituted and mono- and polyalkyl substituted piperidino, morpholino, thiamorpholino, piperazino, pyrrolidino, hexamethyleneimino, heptamethyleneimino, octamethyleneimino, and homomorpholino wherein each alkyl is of from 1 to 4 carbon atoms, inclusive, and (2) pharmacologically acceptable acid addition salts thereof.

2. N - arylsulfonyl - N' - (cyclicamino)urea having the formula:

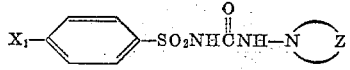

wherein $X_1$ is alkyl of from 1 to 8 carbon atoms, inclusive, and

is piperidino.

3. N - arylsulfonyl - N' - (cyclicamino)urea having the formula:

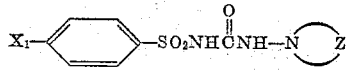

wherein $X_1$ is alkyl of from 1 to 8 carbon atoms, inclusive, and

is hexamethyleneimino.

4. N-arylsulfonyl-N'-(cyclicamino)urea having the formula:

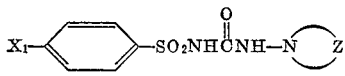

wherein $X_1$ is halogen and

is piperidino.

5. N-arylsulfonyl-N'-(cyclicamino)urea having the formula:

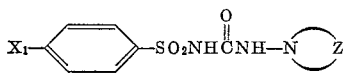

wherein $X_1$ is halogen and

is hexamethyleneimino.

6. N-arylsulfonyl-N'-(cyclicamino)urea having the formula:

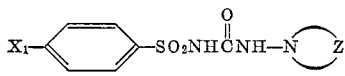

wherein $X_1$ is alkoxy of from 1 to 8 carbon atoms, inclusive, and

is piperidino.

7. N-arylsulfonyl-N'-(cyclicamino)urea having the formula:

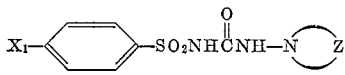

wherein $X_1$ is alkoxy of from 1 to 8 carbon atoms, inclusive, and

is hexamethyleneimino.

8. N-(4-chlorobenzenesulfonyl)-N'-hexamethyleneiminourea.
9. N-(4-methylbenzenesulfonyl)-N'-piperidinourea.
10. N-(4-methylbenzenesulfonyl)-N'-hexamethyleneiminourea.
11. N-(4-methylbenzenesulfonyl)-N'-(4,4-dimethylpiperidino)urea.
12. N-(4-methylbenzenesulfonyl)-N'-(4-methylpiperidino)urea.
13. A composition effective for the treatment of diabetes perorally comprising as active ingredient about 50 mg. to about 500 mg. of at least one compound selected from the group consisting of (1) N-arylsulfonyl-N'-(cyclicamino)urea free bases having the formula:

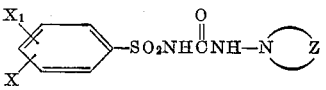

wherein X and $X_1$ are selected from the group consisting of hydrogen, halogen, alkyl of from 1 to 8 carbon atoms, inclusive, alkoxy of from 1 to 8 carbon atoms, inclusive, and primary amino ($NH_2$), and

−N⟨Z⟩ is saturated heterocyclic amino selected from the group consisting of unsubstituted and mono- and polyalkyl substituted piperidino, morpholino, thiamorpholino, piperazino, pyrrolidino, hexamethyleneimino, heptamethyleneimino, octamethyleneimino, and homomorpholino wherein each alkyl is of from 1 to 4 carbon atoms, inclusive, and (2) pharmacologically acceptable acid addition salts thereof, and a diluent amount of a pharmaceutically acceptable carrier.

14. A composition effective for the treatment of diabetes perorally comprising as active ingredient about 50 mg. to about 500 mg. of N-(4-chlorobenzenesulfonyl)-N'-hexamethyleneiminourea free base, and a diluent amount of a pharmaceutically acceptable carrier.

15. A composition effective for the treatment of diabetes perorally comprising as active ingredient about 50 mg. of about 500 mg. of N-(4-methylbenzenesulfonyl)-N'-hexamethyleneiminourea free base, and a diluent amount of a pharmaceutically acceptable carrier.

References Cited in the file of this patent

UNITED STATES PATENTS

| | | |
|---|---|---|
| 2,953,578 | Haack et al. | Sept. 20, 1960 |
| 2,968,158 | Ruschig et al. | Jan. 17, 1961 |

OTHER REFERENCES

Richter's Organic Chemistry, vol. IV, pages 3–7 (1947).
Haack: Arzn.-Forsch., vol. 8, No. 7a, pages 444–448, July (1958).